(12) United States Patent
Hung

(10) Patent No.: US 10,914,420 B2
(45) Date of Patent: Feb. 9, 2021

(54) EXTENSION ARM DEVICE WITH REINFORCEMENT STRUCTURE

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD, Taichung (TW)

(*) Notice: Subject to any disclaimer, the term of this patent is extended or adjusted under 35 U.S.C. 154(b) by 0 days.

(21) Appl. No.: 16/520,669

(22) Filed: Jul. 24, 2019

(65) Prior Publication Data

US 2020/0049307 A1 Feb. 13, 2020

(30) Foreign Application Priority Data

Aug. 8, 2018 (TW) .............................. 107127543 A

(51) Int. Cl.
*F16M 13/02* (2006.01)
*F16M 11/10* (2006.01)
*F16M 11/20* (2006.01)

(52) U.S. Cl.
CPC ........... *F16M 13/022* (2013.01); *F16M 11/10* (2013.01); *F16M 11/2042* (2013.01); *F16M 2200/063* (2013.01)

(58) Field of Classification Search
CPC .. F16M 13/022; F16M 11/10; F16M 11/2042; F16M 2200/063; F16M 2200/065; F16M 11/2092; F16M 11/24; F16M 2200/044; F16M 11/043; F16M 11/16
USPC .................................. 248/584, 281.11, 284.1
See application file for complete search history.

(56) References Cited

U.S. PATENT DOCUMENTS

| | | | | |
|---|---|---|---|---|
| 4,695,024 A * | 9/1987 | Haven | ..................... | A61B 6/447 248/280.11 |
| 6,030,130 A * | 2/2000 | Paddock | ............ | F16M 11/2014 248/278.1 |
| 8,066,251 B2 * | 11/2011 | Brown | ................... | F16M 11/24 248/584 |
| 8,070,114 B2 * | 12/2011 | Chen | ..................... | F16M 11/14 248/121 |
| 8,469,323 B1 * | 6/2013 | Deros | ................. | F16M 11/105 248/123.11 |
| 8,777,172 B2 * | 7/2014 | Sapper | ................... | F16M 11/08 248/274.1 |

(Continued)

FOREIGN PATENT DOCUMENTS

| | | |
|---|---|---|
| CN | 101287945 A | 10/2008 |
| CN | 201273438 Y | 7/2009 |
| TW | M571295 U | 12/2018 |

OTHER PUBLICATIONS

Search Report appended to an Office Action, which was issued to Taiwanese counterpart application No. 107127543 by the TIPO dated Jun. 25, 2019, with an English translation thereof.

*Primary Examiner* — Muhammad Ijaz
(74) *Attorney, Agent, or Firm* — Husch Blackwell LLP

(57) ABSTRACT

An extension arm device includes first and second joint brackets and two linking arms pivotally connected therebetween to form a four-linkage mechanism. Each linking arm includes two parallel side walls and a cover wall interconnecting the side walls. Each side wall of at least one linking arm has a side reinforcement structure which is embossed from an inner or outer wall surface and which extends in a lengthwise direction so as to enhance the structural stiffness of the side wall.

10 Claims, 8 Drawing Sheets

(56) References Cited

U.S. PATENT DOCUMENTS

| | | | |
|---|---|---|---|
| 9,706,843 B2* | 7/2017 | Hung | F16M 11/105 |
| 2007/0040084 A1* | 2/2007 | Sturman | F16M 11/041 |
| | | | 248/280.11 |
| 2009/0008524 A1* | 1/2009 | Huang | F16M 11/2092 |
| | | | 248/278.1 |
| 2013/0112828 A1* | 5/2013 | Sapper | F16M 13/022 |
| | | | 248/274.1 |
| 2019/0178440 A1* | 6/2019 | Chang | F16M 11/046 |
| 2020/0049307 A1* | 2/2020 | Hung | F16M 13/022 |
| 2020/0063896 A1* | 2/2020 | Hung | F16M 11/10 |
| 2020/0063910 A1* | 2/2020 | Hung | F16M 11/2014 |
| 2020/0063914 A1* | 2/2020 | Hung | F16M 11/046 |
| 2020/0141536 A1* | 5/2020 | Ikeda | B21D 5/02 |

* cited by examiner

EXTENSION ARM DEVICE WITH REINFORCEMENT STRUCTURE

CROSS-REFERENCE TO RELATED APPLICATION

This application claims priority of Taiwanese Patent Application No. 107127543, filed on Aug. 8, 2018.

FIELD

The disclosure relates to an extension arm device for supporting a user device, and more particularly to an extension arm device with two parallel linking arms pivotally connected with two joint brackets to form a four-linkage mechanism.

BACKGROUND

A conventional extension arm device for supporting an object (such as a tabletop, flat panel display, etc.), as disclosed in German Patent Registration No. 202017107086, includes upper and lower channels, a proximal endcap pivotally connected to proximal ends of the upper and lower channels, a distal endcap pivotally connected to distal ends of the upper and lower channels to form an adjustable four-linkage mechanism, and a gas spring disposed between the upper and lower channels to permit the extension arm device to be adjusted and to retain the four-linkage mechanism in a desired height position. Each of the upper and lower channels is typically in the form of a metal sheet to reduce the weight and size thereof. There is a need to provide a sufficient structural strength to bear the weight of the suspended object without adversely affecting the load capacity of the gas spring.

SUMMARY

Therefore, an object of the disclosure is to provide an extension arm device that can alleviate at least one of the drawbacks of the prior art.

According to the disclosure, the extension arm device includes a joint unit and two linking arms. The joint unit includes first and second joint brackets which are spaced apart from each other. Each of the linking arms is pivotally connected between the first and second joint brackets such that the linking arms and the first and second joint brackets are cooperatively formed as a four-linkage mechanism. Each of the linking arms includes two side walls which are spaced apart from each other in a widthwise direction by a first width and extend parallel to each other in a lengthwise direction, and a cover wall which interconnects the side walls and extends in the lengthwise direction. Each of the side walls has an inner wall surface which faces the inner wall surface of an opposite one of the side walls, and an outer wall surface which is opposite to the inner wall surface in the widthwise direction. Each of the side walls of at least one of the linking arms has at least one side reinforcement structure which is embossed from either one of the inner and outer wall surfaces and which extends in the lengthwise direction.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
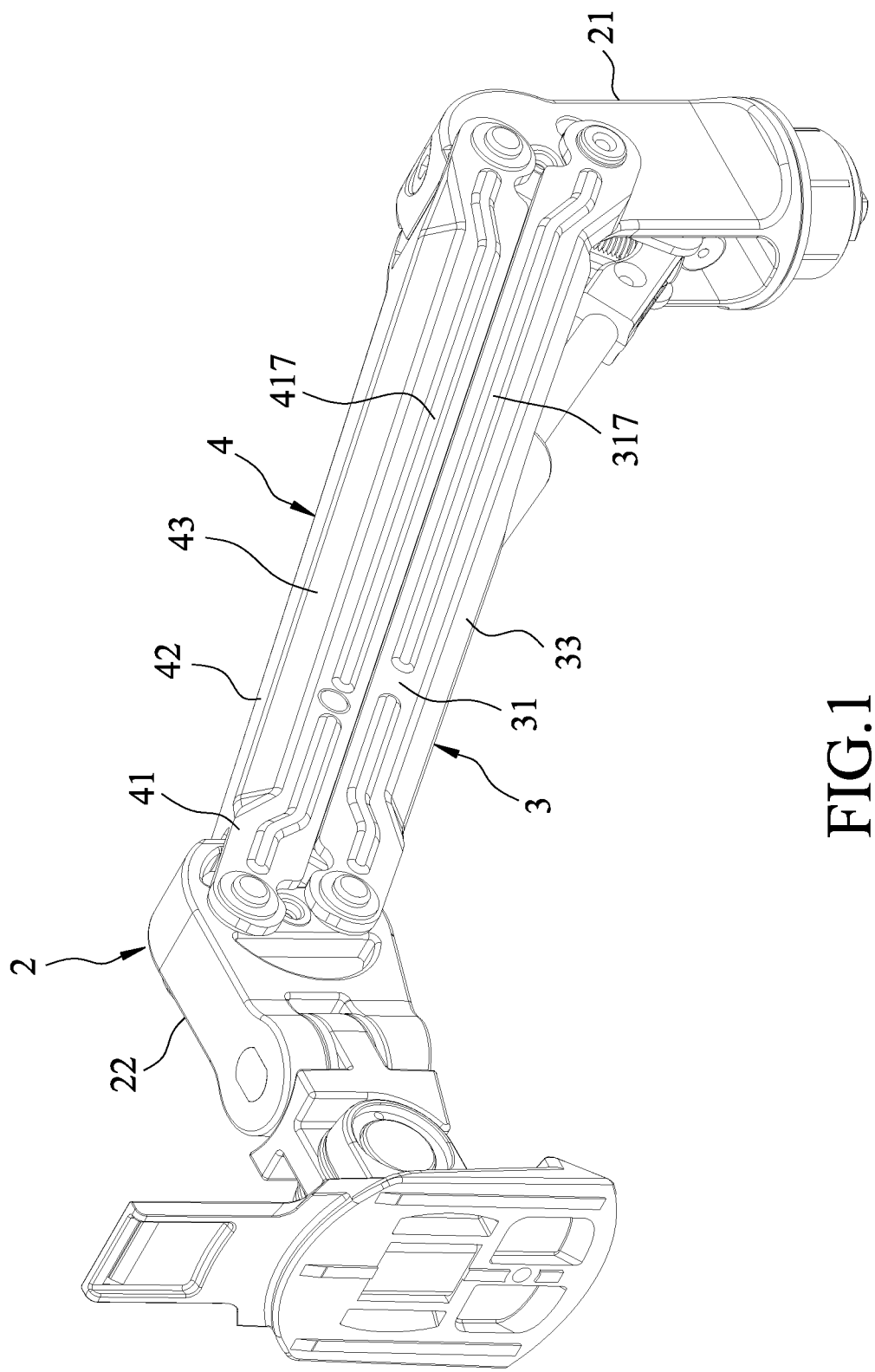
FIG. 1 is a perspective view illustrating an embodiment of an extension arm device according to the disclosure.
Figure 2:
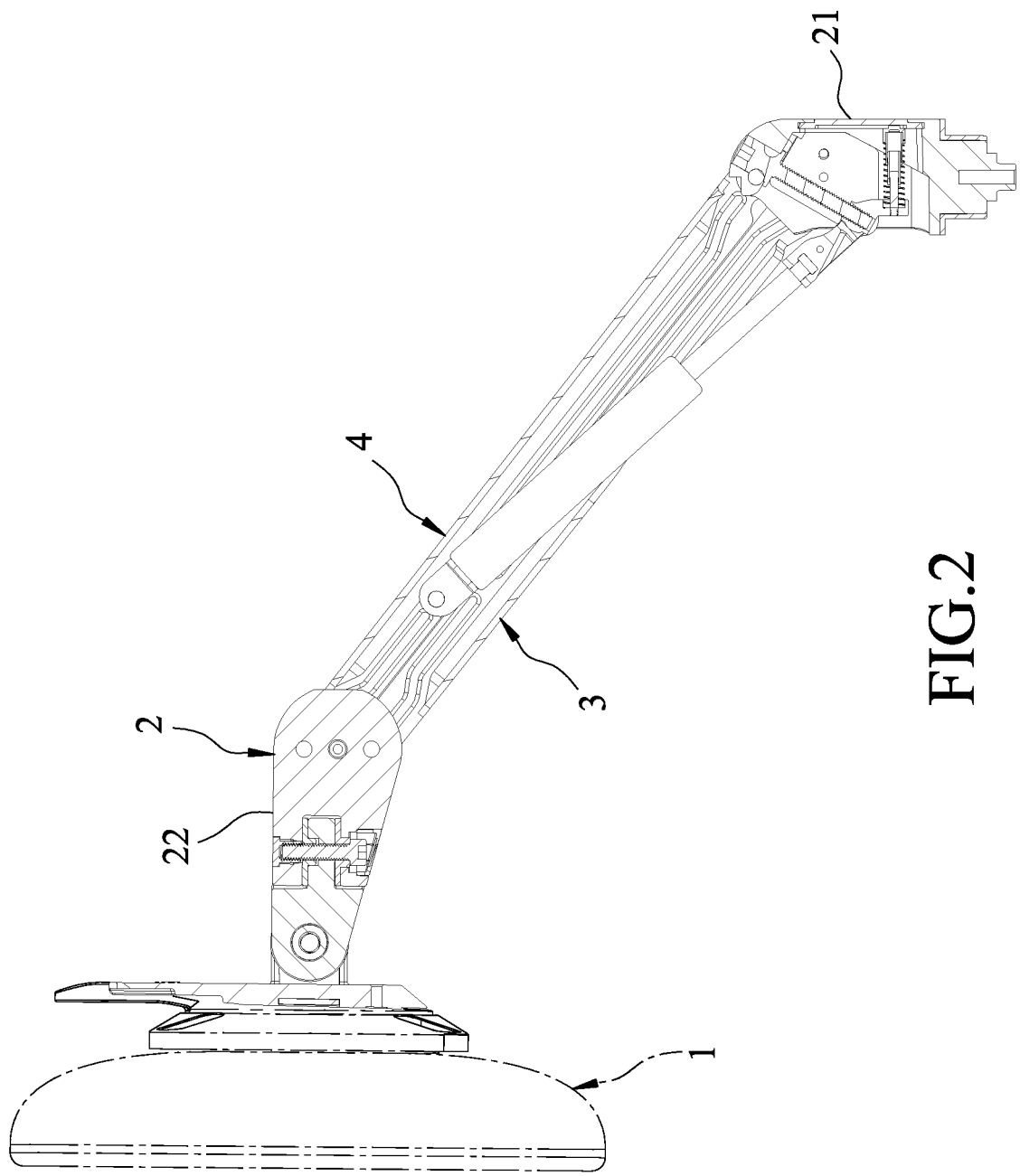
FIG. 2 is a sectional view of the embodiment.

Referring to FIGS. 1 and 2, an embodiment of an extension arm device according to the disclosure is adapted to support an object 1 (such as a display screen), and includes a joint unit 2 and two linking arms 3, 4.

The joint unit 2 includes first and second joint brackets 21, 22 which are spaced apart from each other.

Each of the linking arms 3, 4 is pivotally connected between the first and second joint brackets 21, 22 such that the linking arms 3, 4 and the first and second joint brackets 21, 22 are cooperatively formed as a four-linkage mechanism.

Figure 3:
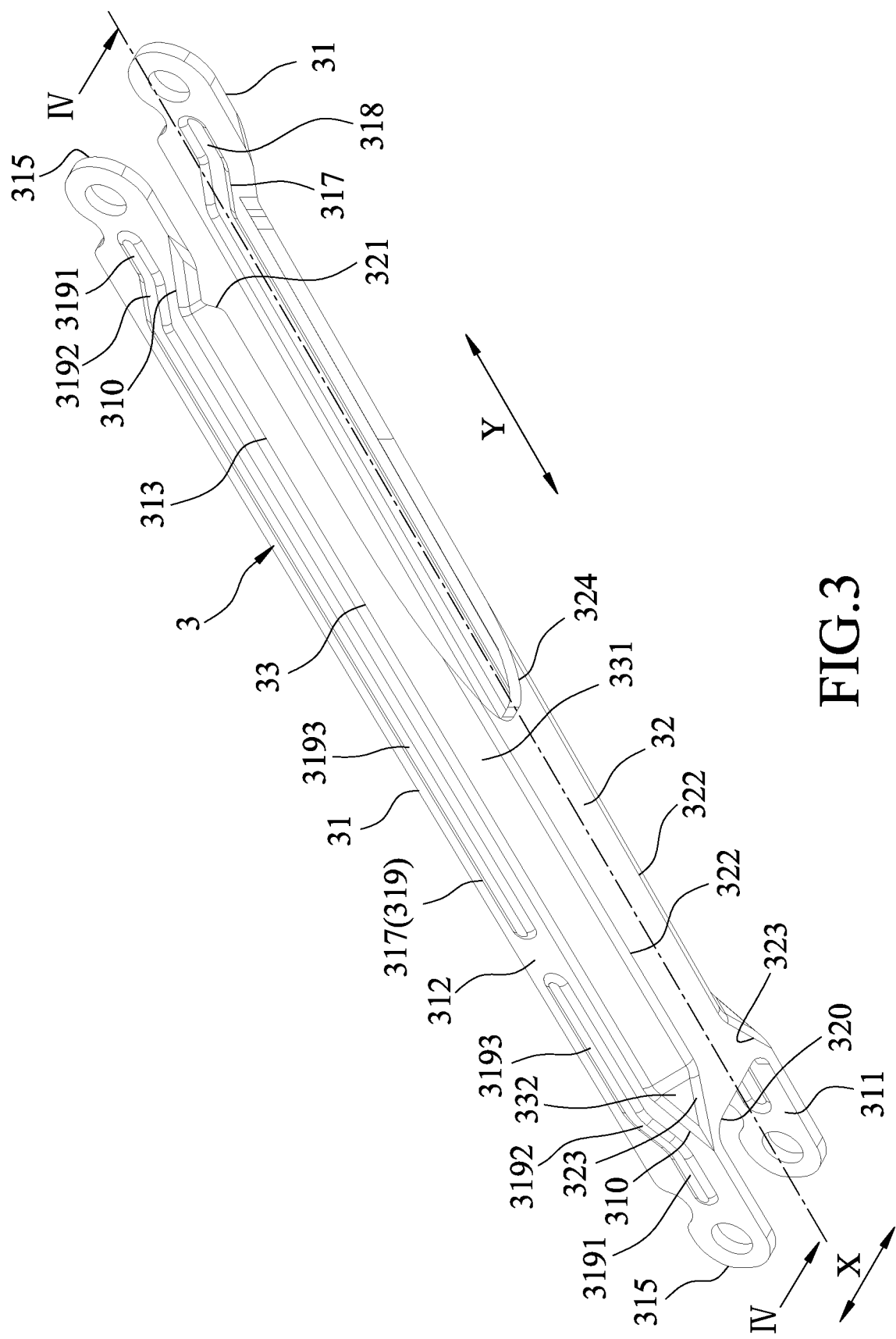
FIG. 3 is a perspective view of a linking arm of the embodiment.
Figure 4:
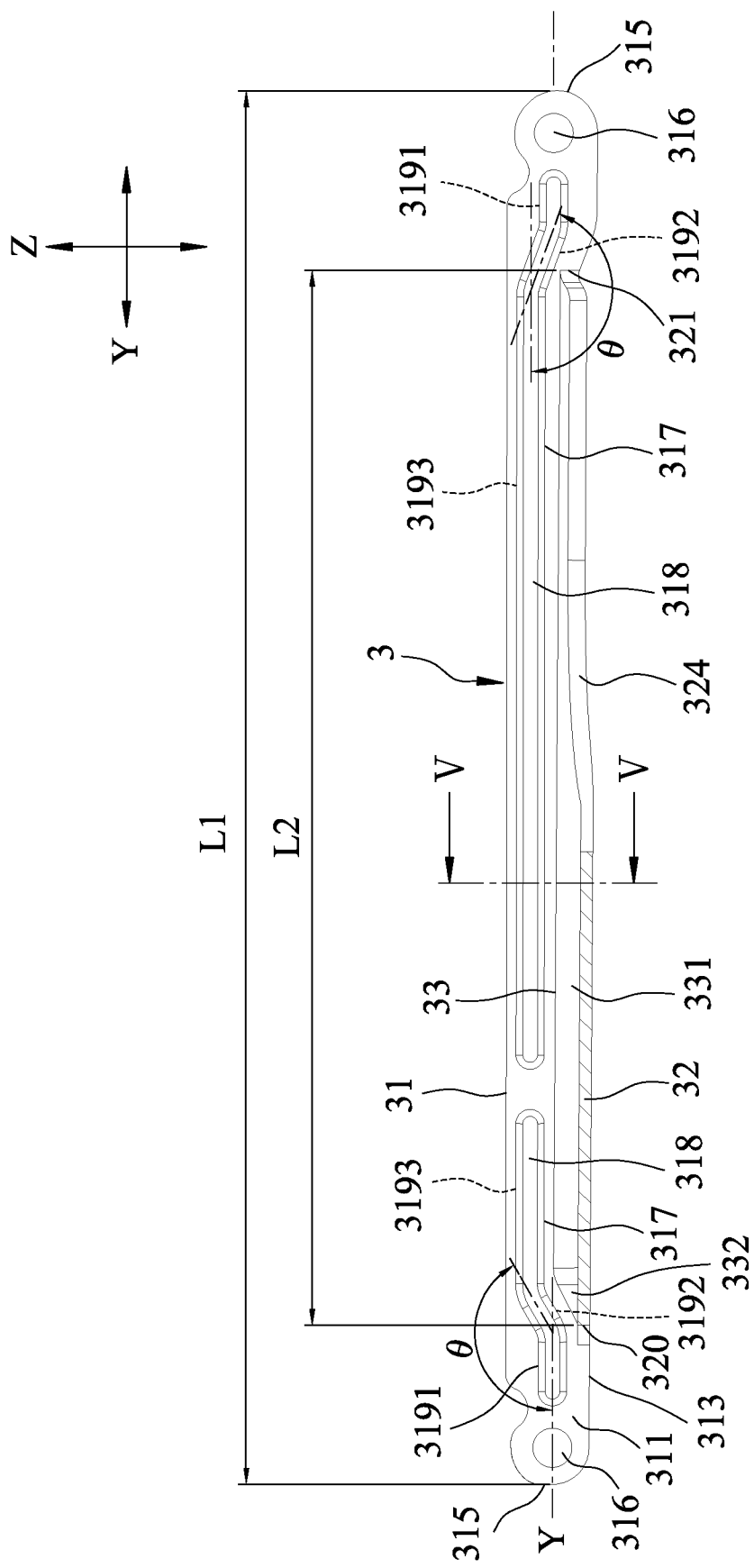
FIG. 4 is a sectional view taken along line IV-IV of FIG. 3.
Figure 5:
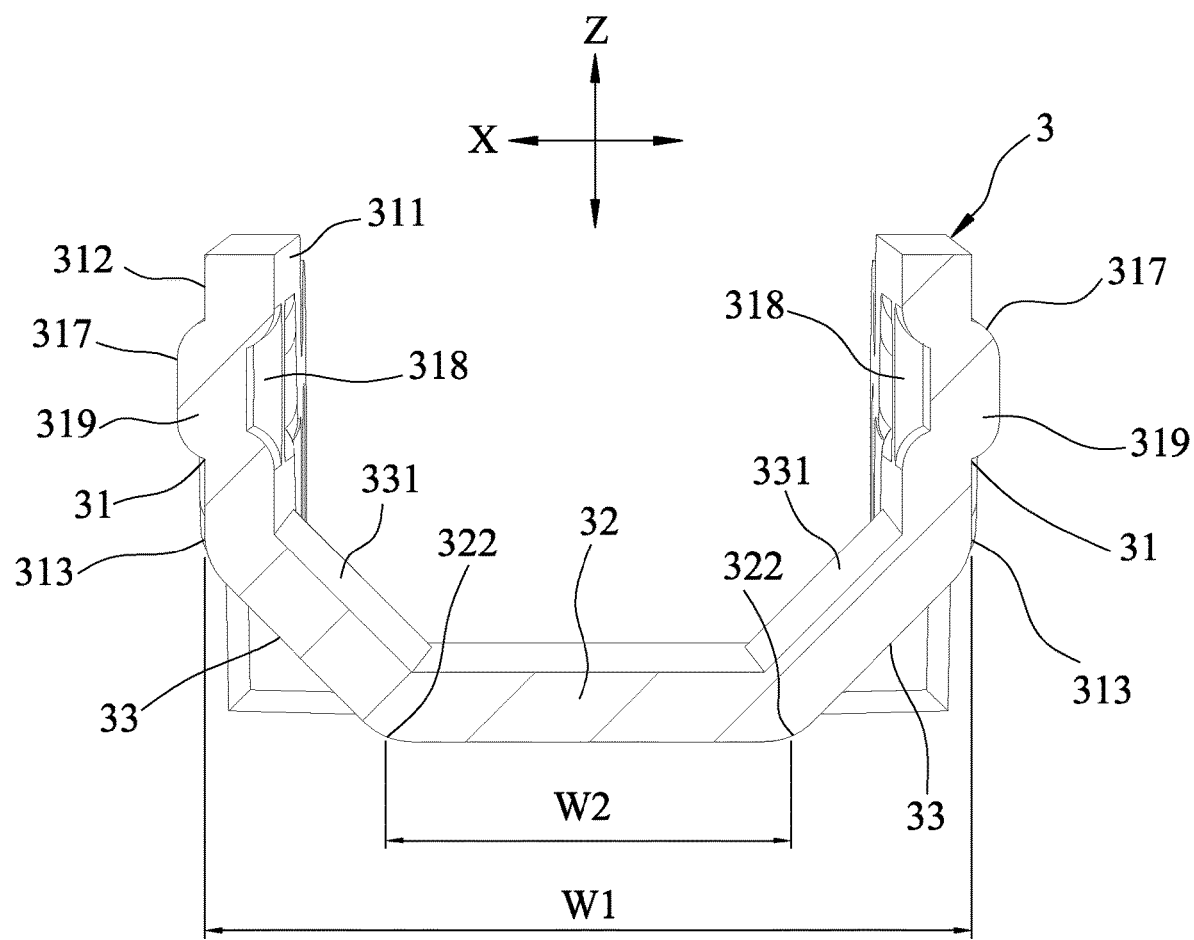
FIG. 5 is a sectional view taken along line V-V of FIG. 4.

With reference to FIGS. 3 to 5, the linking arm 3 includes two side walls 31 which are spaced apart from each other in a widthwise direction (X) by a first width (W1) and extend parallel to each other in a lengthwise direction (Y), a cover wall 32 which interconnects the side walls 31 and extends in the lengthwise direction (Y), and two corner reinforcement structures 33.

Each of the side walls 31 has an inner wall surface 311 which faces the inner wall surface 311 of an opposite one of the side walls 31, and an outer wall surface 312 which is opposite to the inner wall surface 311 in the widthwise direction (X). Further, each of the side walls 31 extends in an upright direction (Z) that is transverse to both the widthwise and lengthwise directions (X, Y) to terminate at an end edge 313 which extends in the lengthwise direction (Y). Also, each of the side walls 31 extends in the lengthwise direction (Y) to terminate at two first lengthwise ends 315 which are distanced from each other by a first length (L1). The end edge 313 has two first inclined edge segments 310 which are formed adjacent to the first lengthwise ends 315, respectively, and which are inclined relative to the lengthwise direction (Y). Each of the side walls 31 further has a pair of through holes 316, each of which is formed adjacent to a respective one of the first lengthwise ends 315, and which extends in the widthwise direction (X), and two side reinforcement structures 317 which are spaced apart from each other in the lengthwise direction (Y). Each of the side reinforcement structures 317 has an embossment portion 319 embossed from the outer wall surface 312, and a debossment portion 318 debossed in the inner wall surface 311 and opposite to the embossment portion 319 in the widthwise direction (X). The embossment portion 319 has first and second straight segments 3191, 3193 which extend parallel to each other in the lengthwise direction (Y) and which are spaced apart from each other in both the lengthwise and upright directions (Y, Z), and an inclined segment 3192 which extends to interconnect the first and second straight segments 3191, 3193 and which cooperates with the first straight segment 3191 to define an included angle (8).

The cover wall 32 extends in the lengthwise direction (Y) to terminate at two second lengthwise ends 320, 321 which are distanced from each other by a second length (L2). Further, the cover wall 32 extends in the widthwise direction (X) to terminate at two side edges 322 which are spaced apart from and adjacent to the end edges 313 of the side walls 31, respectively, and which are distanced from each other by a second width (W2). Each of the side edges 322 has a second inclined edge segment 323 which is formed adjacent to and spaced apart from one of the first inclined edge segments 310, and which is inclined relative to the lengthwise direction (Y). Also, the cover wall 32 has a notch 324 which extends from the second lengthwise end 321 toward the second lengthwise end 320.

In this embodiment, the first length (L1) is larger than the second length (L2). The first width (W1) is larger than the second width (W2). The included angle (8) is of 160 degrees.

Each of the corner reinforcement structures 33 has a flat wall segment 331 which interconnects the end edge 313 of the corresponding side wall 31 and the respective side edge 322 of the cover wall 32, and a chamfer wall segment 332 which interconnects the first inclined edge segment 310 and the second inclined edge segment 323 that are remote from the notch 324.

Figure 6:
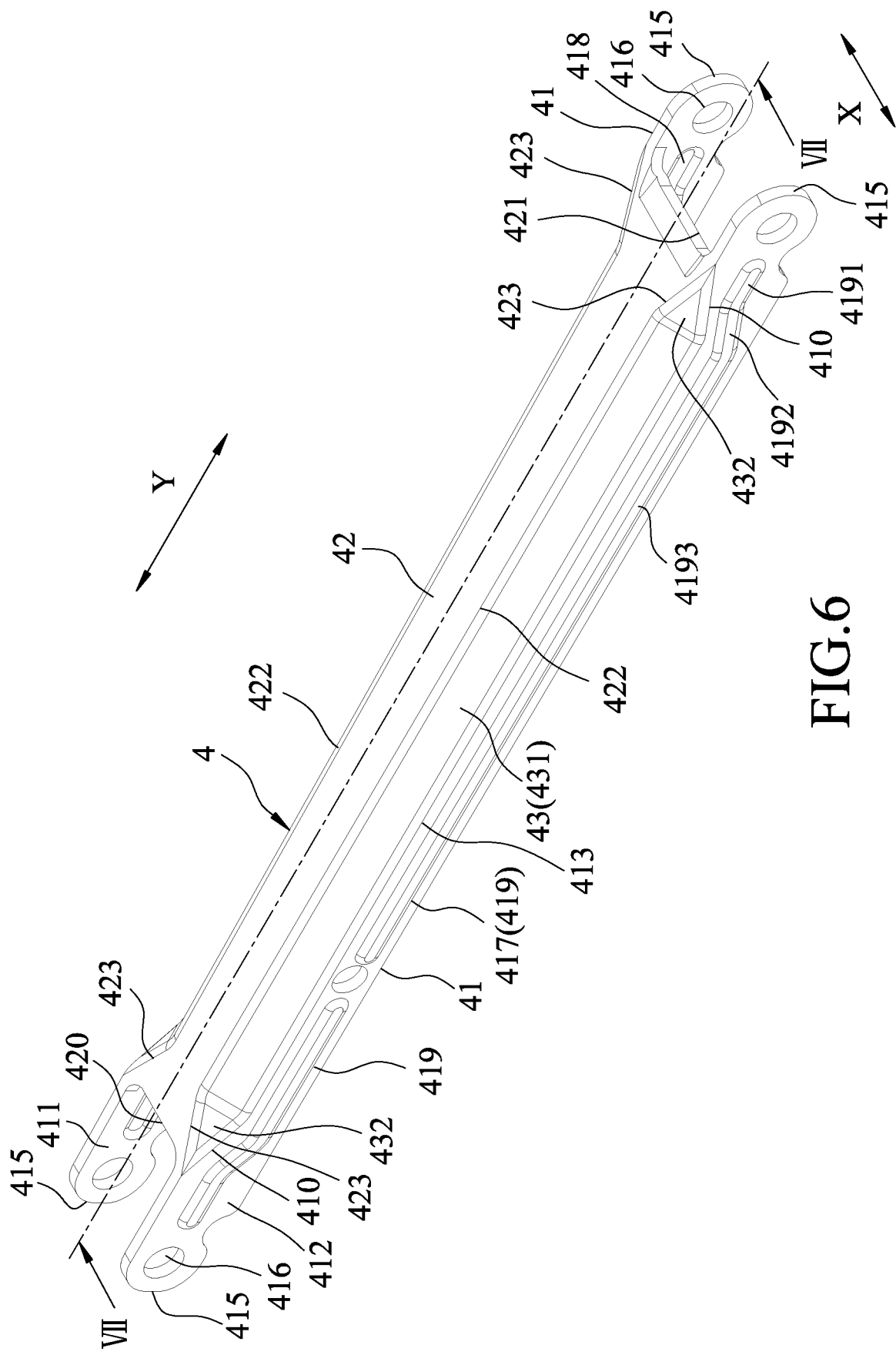
FIG. 6 is a perspective view of another linking arm of the embodiment.
Figure 7:
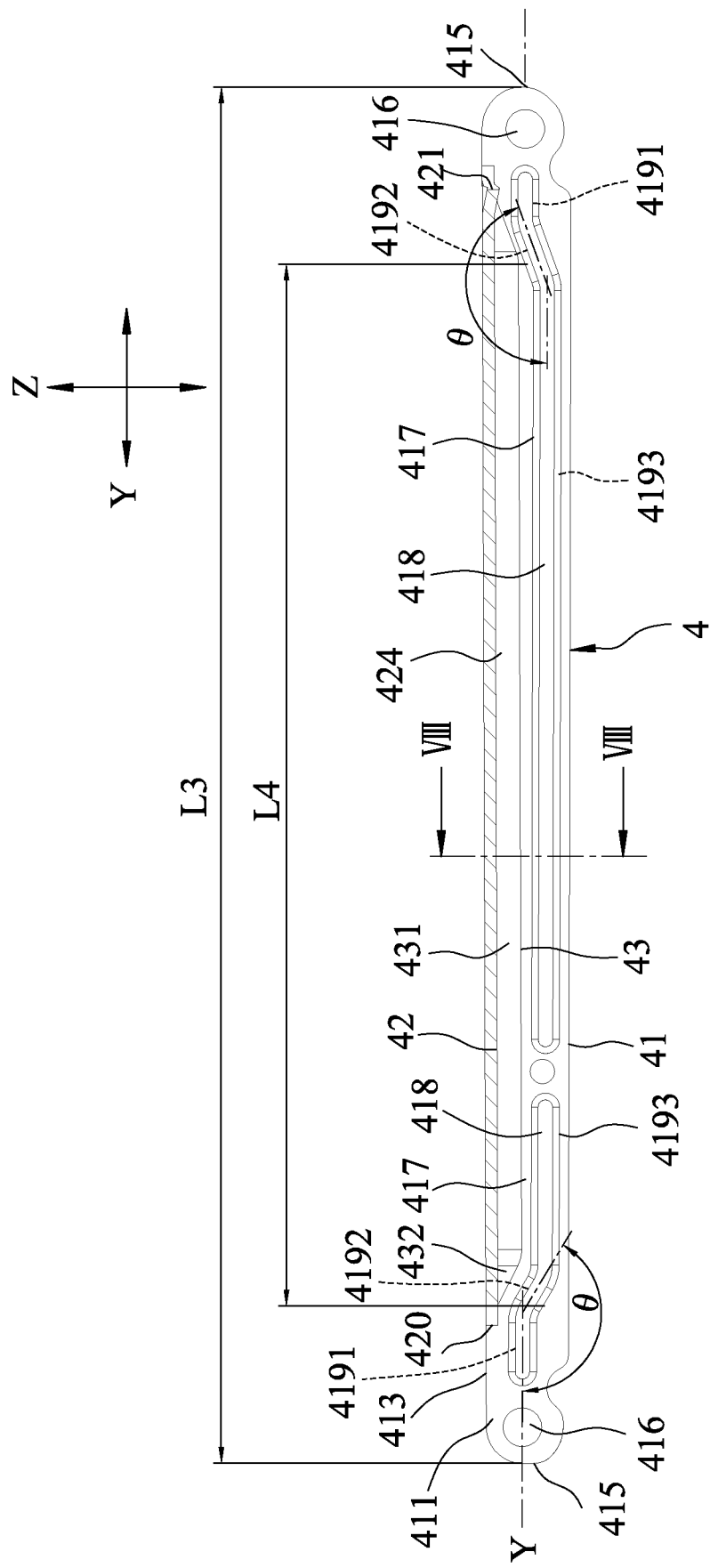
FIG. 7 is a sectional view taken along line VII-VII of FIG. 6.
Figure 8:
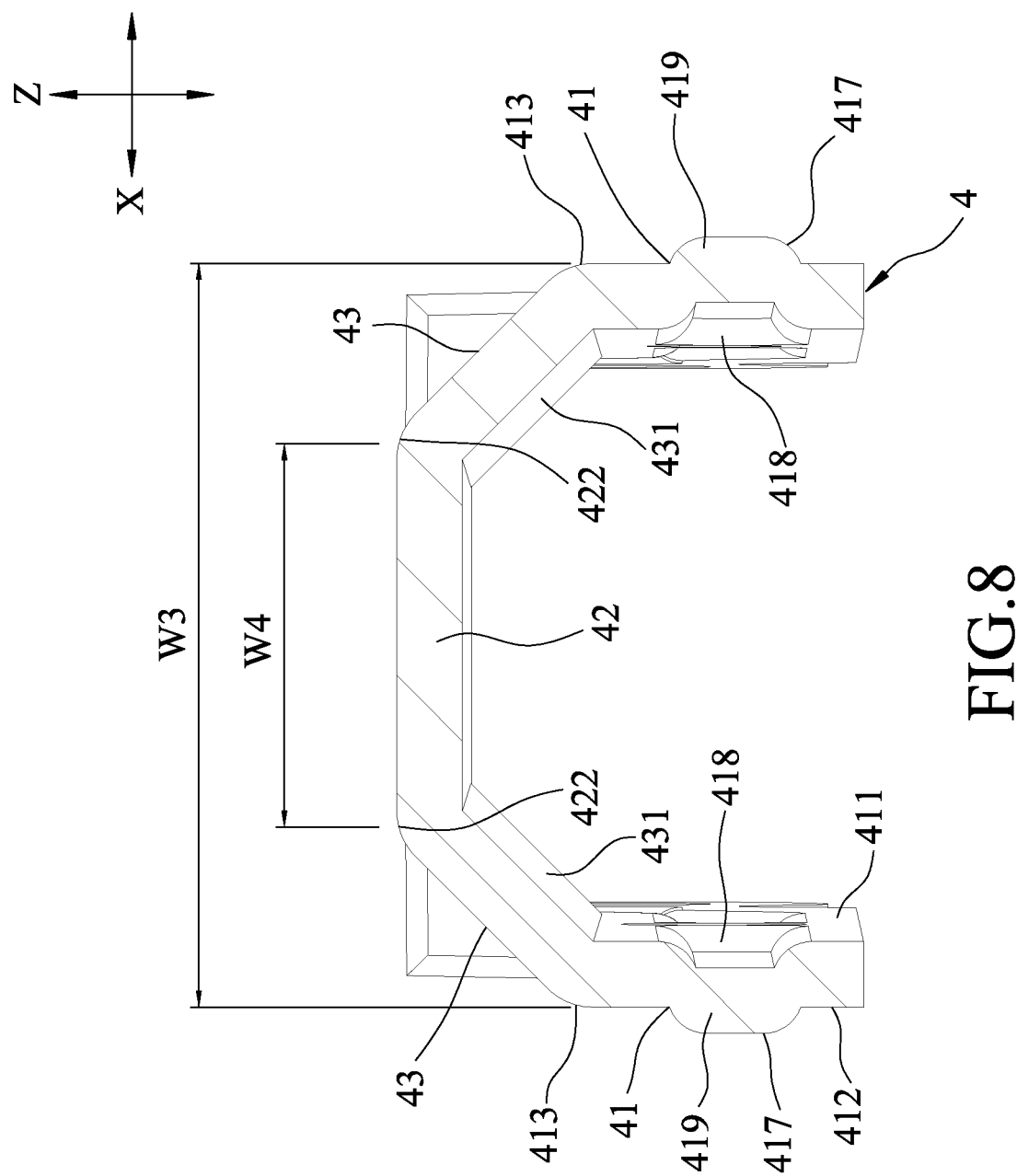
FIG. 8 is a sectional view taken along line VIII-VIII of FIG. 7.

With reference to FIGS. 6 to 8, the linking arm 4 includes two side walls 41 which are spaced apart from each other in the widthwise direction (X) by a first width (W3) and extend parallel to each other in the lengthwise direction (Y), a cover wall 42 which interconnects the side walls 41 and extends in the lengthwise direction (Y), and two corner reinforcement structures 43.

Each of the side walls 41 has an inner wall surface 411 which faces the inner wall surface 411 of an opposite one of the side walls 41, and an outer wall surface 412 which is opposite to the inner wall surface 411 in the widthwise direction (X). Further, each of the side walls 41 extends in the upright direction (Z) to terminate at an end edge 413 which extends in the lengthwise direction (Y). Also, each of the side walls 41 extends in the lengthwise direction (Y) to terminate at two first lengthwise ends 415 which are distanced from each other by a first length (L3). The end edge 413 has two first inclined edge segments 410 which are formed adjacent to the first lengthwise ends 415, respectively, and which are inclined relative to the lengthwise direction (Y). Each of the side walls 41 further has a pair of through holes 416, each of which is formed adjacent to a respective one of the first lengthwise ends 415, and which extends in the widthwise direction (X), and two side reinforcement structures 417 which are spaced apart from each other in the lengthwise direction (Y). Each of the side reinforcement structures 417 has an embossment portion 419 embossed from the outer wall surface 412, and a debossment portion 418 debossed in the inner wall surface 411 and opposite to the embossment portion 419 in the widthwise direction (X). The embossment portion 419 has first and second straight segments 4191, 4193 which extend parallel to each other in the lengthwise direction (Y) and which are spaced apart from each other in both the lengthwise and upright directions (Y, Z), and an inclined segment 4192 which extends to interconnect the first and second straight segments 4191, 4193 and which cooperates with the first straight segment 4191 to define an included angle (8).

The cover wall 42 extends in the lengthwise direction (Y) to terminate at two second lengthwise ends 420, 421 which are distanced from each other by a second length (L4). Further, the cover wall 42 extends in the widthwise direction (X) to terminate at two side edges 422 which are spaced apart from and adjacent to the end edges 413 of the side walls 41, respectively, and which are distanced from each other by a second width (W2). Each of the side edges 422 has two second inclined edge segments 423 which are formed adjacent to and spaced apart from the first inclined edge segments 410, respectively, and which are inclined relative to the lengthwise direction (Y).

In this embodiment, the first length (L3) is larger than the second length (L4). The first width (W3) is larger than the second width (W4). The included angle (8) is of 160 degrees.

Each of the corner reinforcement structures 43 has a flat wall segment 431 which interconnects the end edge 413 of the corresponding side wall 41 and the respective side edge 422 of the cover wall 42, and two chamfer wall segments 432 each of which interconnects the respective first inclined edge segment 410 and the corresponding second inclined edge segment 423.

The side reinforcement structures 317, 417 and the corner reinforcement structures 33, 43 may be integrally formed with the corresponding linking arms 3, 4 made in a stamp/forming process such that each of the linking arms 3, 4 is configured to be in the form of a bent sheet defining a mounting space for mounting an extension and retraction mechanism. The extension arm device has enhanced structural strength and stiffness without compromising the range of motion of the extension and retraction mechanism and increasing the weight and size thereof.

As illustrated, with the side reinforcement structures 317, 417, additional structural stiffness can be provided to the side walls 31, 41. With the corner reinforcement structures 33, 43, additional structural strength can be provided to the juncture between the side walls 31, 41 and the cover wall 32, 42. Therefore, the load capacity and service life of the linking arms 3, 4 can be increased without the need to increase the weight and size of the extension arm device.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An extension arm device comprising:
   a joint unit including first and second joint brackets which are spaced apart from each other; and
   two linking arms each pivotally connected between said first and second joint brackets such that said linking arms and said first and second joint brackets are cooperatively formed as a four-linkage mechanism, each of said linking arms including two side walls which are spaced apart from each other in a widthwise direction by a first width and extend parallel to each other in a lengthwise direction, and a cover wall which interconnects said side walls and extends in the lengthwise direction, each of said side walls having an inner wall surface which faces said inner wall surface of an opposite one of said side walls, and an outer wall surface which is opposite to said inner wall surface in the widthwise direction, each of said side walls of at least one of said linking arms having at least one side reinforcement structure which is embossed from either one of said inner and outer wall surfaces and which extends in the lengthwise direction.

2. The extension arm device as claimed in claim 1, wherein each of said side walls of each of said linking arms has said at least one side reinforcement structure.

3. An extension arm device comprising:
a joint unit including first and second joint brackets which are spaced apart from each other; and
two linking arms each pivotally connected between said first and second joint brackets such that said linking arms and said first and second joint brackets are cooperatively formed as a four-linkage mechanism, each of said linking arms including two side walls which are spaced apart from each other in a widthwise direction by a first width and extend parallel to each other in a lengthwise direction, and a cover wall which interconnects said side walls and extends in the lengthwise direction, each of said side walls having an inner wall surface which faces said inner wall surface of an opposite one of said side walls, and an outer wall surface which is opposite to said inner wall surface in the widthwise direction, each of said side walls of at least one of said linking arms having at least one side reinforcement structure which is embossed from either one of said inner and outer wall surfaces and which extends in the lengthwise direction;
wherein each of said side walls of each of said linking arms has said at least one side reinforcement structure; and
wherein said at least one side reinforcement structure has an embossment portion embossed from said outer wall surface, and a debossment portion debossed in said inner wall surface and opposite to said embossment portion in the widthwise direction.

4. The extension arm device as claimed in claim 3, wherein each of said side walls of each of said linking arms extends in an upright direction that is transverse to both the widthwise and lengthwise directions to terminate at an end edge which extends in the lengthwise direction and which is disposed adjacent to said cover wall.

5. The extension arm device as claimed in claim 4, wherein said embossment portion of said at least one side reinforcement structure has first and second straight segments which extend parallel to each other in the lengthwise direction and which are spaced apart from each other in both the lengthwise and upright directions, and an inclined segment which extends to interconnect said first and second straight segments and which cooperates with said first straight segment to define an included angle.

6. The extension arm device as claimed in claim 4, wherein said cover wall extends in the widthwise direction to terminate at two side edges which are spaced apart from and adjacent to said end edges of said side walls, respectively, and which are distanced from each other by a second width, each of said linking arms having two corner reinforcement structures, each of which interconnects each of said end edges and a respective one of said side edges.

7. The extension arm device as claimed in claim 6, wherein each of said side walls of each of said linking arms extends in the lengthwise direction to terminate at two first lengthwise ends which are distanced from each other by a first length, said cover wall of each of said linking arms extending in the lengthwise direction to terminate at two second lengthwise ends which are distanced from each other by a second length, the first length being larger than the second length.

8. The extension arm device as claimed in claim 7, wherein said cover wall of one of said linking arms has a notch which extends from one of said second lengthwise ends toward the other one of said second lengthwise ends.

9. The extension arm device as claimed in claim 6, wherein the first width is larger than the second width.

10. The extension arm device as claimed in claim 6, wherein said end edge of each of said side walls has two first inclined edge segments which are formed adjacent to two lengthwise ends, respectively, and which are inclined relative to the lengthwise direction, each of said side edges of said cover wall having at least one second inclined edge segment which is formed adjacent to and spaced apart from one of said two first inclined edge segments, and which is inclined relative to the lengthwise direction, each of said corner reinforcement structures having a flat wall segment which interconnects each of said end edges and said respective side edge, and at least one chamfer wall segment which interconnects one of said two first inclined edge segments and said second inclined edge segment.

\* \* \* \* \*